United States Patent [19]
Diesing et al.

[11] Patent Number: 5,407,383
[45] Date of Patent: Apr. 18, 1995

[54] METHOD FOR DETACHING THE WINGS FROM POULTRY BODIES AND AN APPARATUS FOR CARRYING OUT THE METHOD

[75] Inventors: Karl-Heinz Diesing, Lübeck; Peter Groth, Ratzeburg; Peter Muuhs, Lübeck, all of Germany

[73] Assignee: Nordischer Maschinenbau Rud, Baader GmbH & Co KG, Lubeck, Germany

[21] Appl. No.: 196,489

[22] Filed: Feb. 15, 1994

[30] Foreign Application Priority Data

Feb. 17, 1993 [DE] Germany ............ 43 04 781.5

[51] Int. Cl.⁶ .................................. A22C 21/00
[52] U.S. Cl. ........................ 452/169; 452/165; 452/169; 452/170
[58] Field of Search ........... 452/169, 165, 170, 166, 452/167

[56] References Cited

U.S. PATENT DOCUMENTS

| | | |
|---|---|---|
| 4,016,624 | 4/1977 | Martin et al. |
| 4,424,608 | 1/1984 | Martin |
| 4,562,613 | 1/1986 | Lewis ................... 452/170 |
| 4,688,297 | 8/1987 | Bartels ................... 452/165 |
| 4,873,746 | 10/1989 | Scheier et al. ............ 452/169 |
| 4,920,610 | 5/1990 | Callsen et al. ............ 452/169 |
| 4,993,115 | 2/1991 | Hazenbroek .............. 452/169 |
| 5,183,434 | 2/1993 | Scheier et al. ............ 452/169 |

FOREIGN PATENT DOCUMENTS

| | | |
|---|---|---|
| 312881 | 4/1989 | European Pat. Off. |
| 431607 | 6/1991 | European Pat. Off. |

*Primary Examiner*—Willis Little
*Attorney, Agent, or Firm*—Fay, Sharpe, Beall, Fagan, Minnich & McKee

[57] ABSTRACT

An apparatus for detaching wings from a poultry body is described in which the detachment is effected by means of three pairs of separating tools with varying arrangements and forms of knife blades. The poultry bodies are prepared as front halves and pass through the processing areas of the separating tools fixed on supporting saddles which are moved forward by conveying means and convey the poultry body with the neck portion leading and the breast portion uppermost. This "three-cut" separation procedure allows an extremely economical detachment of the wing and greatly increases the yield of breast fillet meat while avoiding bone splinters in the region of attachment of the wings.

33 Claims, 2 Drawing Sheets

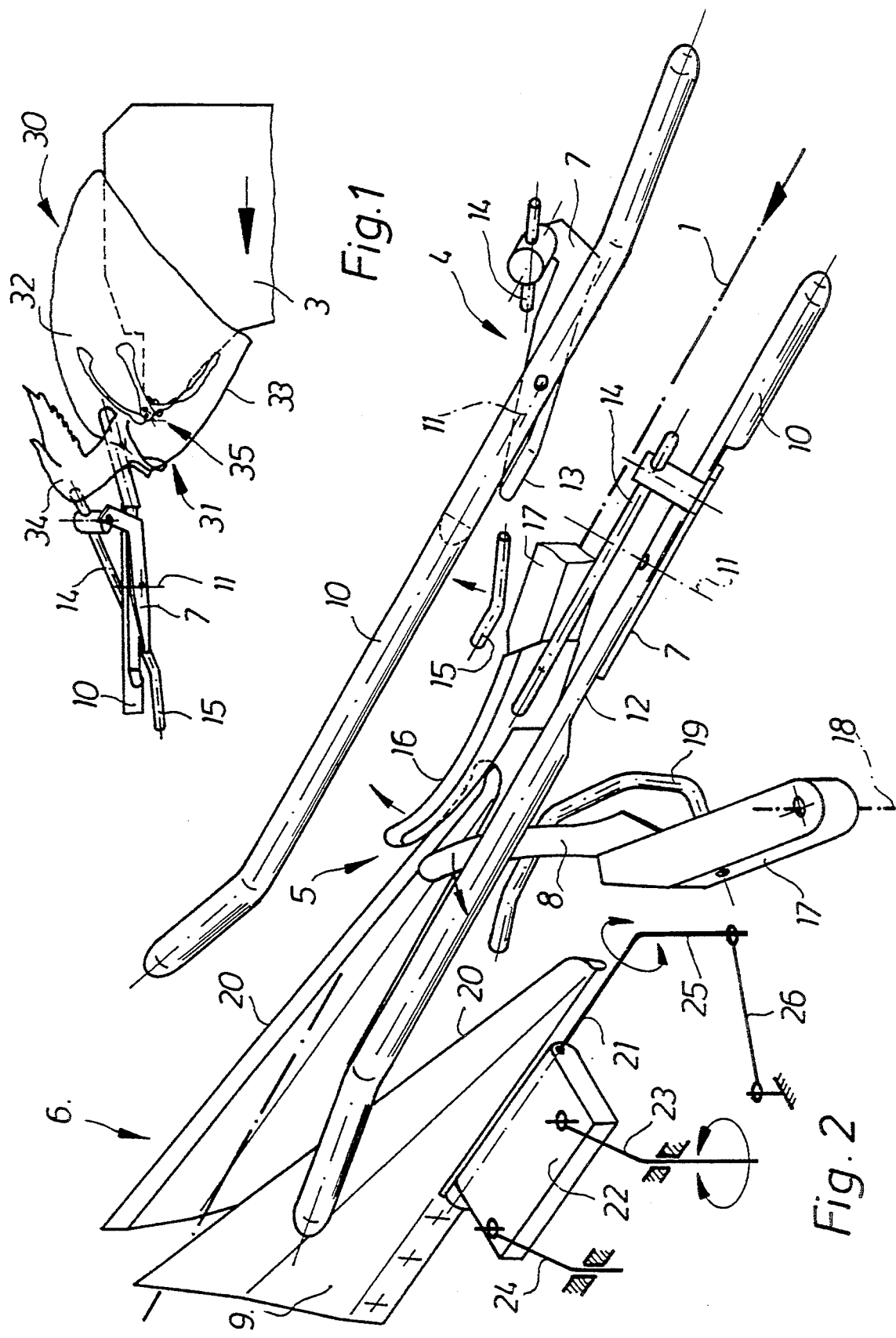

METHOD FOR DETACHING THE WINGS FROM POULTRY BODIES AND AN APPARATUS FOR CARRYING OUT THE METHOD

BACKGROUND OF THE INVENTION

1. Field of the Invention

The invention concerns a method for detaching the wings from poultry bodies by effecting cuts on both sides of the plane of symmetry of the poultry body while lifting the wings away from the poultry body and an apparatus for carrying out this method having conveyor means for conveying the poultry body along its plane of symmetry with the neck portion leading, whereby said poultry bodies pass through a wing detaching device formed by pairs of separating tools arranged symmetrically on either side of the conveyor means and in a mirror inverted manner, in the vicinity of which guide means for seizing and drawing the wings away from the poultry body are arranged, each said separating tool being formed as a knife blade whose cutting edge extends essentially along the path of the poultry bodies.

2. Prior Art

Various embodiments of such apparatus are known.

For example, EP-B1-0 312 881 discloses an apparatus, whereby in one embodiment two separating tool pairs operating sequentially are employed. The function of the first separating tool pair, which is equipped with rotationally driven circular knives, is first to detach the wing tendons in order to enable the lifting of the wing joints out of the body's sockets before the second separating tool becomes comes into operation. By means of this lifting operation, a bone-free space between the wing joint condyle and glenoid cavity is to be achieved, so that the subsequent cut through this space made with the knife blades of the second separating tool pair allows the wings to be detached without causing bone splinters.

Another apparatus of this type is disclosed in U.S. Pat. No. 4,016,624. In this apparatus the poultry bodies are pushed forward with their rear portions leading and the wings, while being held spread or extended, are cut off by controlled knife blades, the cut being guided such that the main wing tendons are severed in an earlier phase. A further apparatus for detaching wings is known from EP-A1-0 431 607. In this apparatus, the wings are detached by means of a pair of rotationally driven circular knives in the same manner as occurs in the apparatus described in U.S. Pat. No. 4,424,608.

In detaching the wings from poultry bodies, particularly when the subsequent processing of the poultry body is aimed at obtaining breast meat in the form of fillets, it is important that in addition to avoiding bone splintering in the area of detachment, the wings are separated with as little loss of fillet meat as possible.

The results obtained by the above described apparatus do not, in particular, satisfy this last requirement, so that the achievable yield of fillet meat is thus reduced.

3. Objects of the invention

It is a general object of the invention to overcome the drawbacks associated with said prior art apparatus.

It is a particular and essential object of the present invention to achieve the separation of wings from poultry bodies while retaining as much fillet meat as possible.

It is a further most important object of this invention to perform such processing without the formation of bone splinters.

SUMMARY OF THE INVENTION

These and further objects are achieved by employing a method for detaching the wings from poultry bodies by effecting cuts on both sides of the plane of symmetry of the poultry bodies which includes performing a pair of first incisions from the breast side of the poultry body for severing the tissue parts in the dip up to the coracolds, a pair of second incisions from the back side of the poultry body for severing the tissue parts between the wings and the back portion as well as the tendons in the region of attachment of the shoulder blades to the coracoids, and a pair of third cuts for severing the remaining tissue parts and tendon connections. This method is performed by means of an apparatus in which there are provided sequentially a pair of first knife blades whose cutting edges are spring loaded such that in the rest position these are arranged to cross the path of the wing joint from the breast side of said poultry body; a pair of second knife blades, whose cutting edges are arranged in a position tangential to the path of the wing joint from the back side of the poultry body and which are resiliently yielding outwards under spring force with respect to the spacing between them; and a pair of third knife blades, whose cutting edges are inclined upwards in the direction of conveyance and oriented to cross the path of the wing joints, the attachment of the knife blades being designed such that they are resiliently yieldable against spring force or controllable with respect to the distance between the blades and the angle formed between the blade pair flanks.

In this way, it is possible to carry out the separation of wings from the poultry body while precisely respecting the anatomical characteristics in such steps, that from step to step the wing is virtually peeled away from the breast meat.

BRIEF DESCRIPTION OF THE DRAWINGS

Other and further objects of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a sectional side view detail of the apparatus associated with a poultry body to be processed which is fixed on a conveying supporting saddle, FIG. 2 shows a simplified representation of the separating apparatus according to the invention viewed axonometrically.

DETAILED DESCRIPTION OF THE PREFERRED EMBODIMENTS

Figure 3:
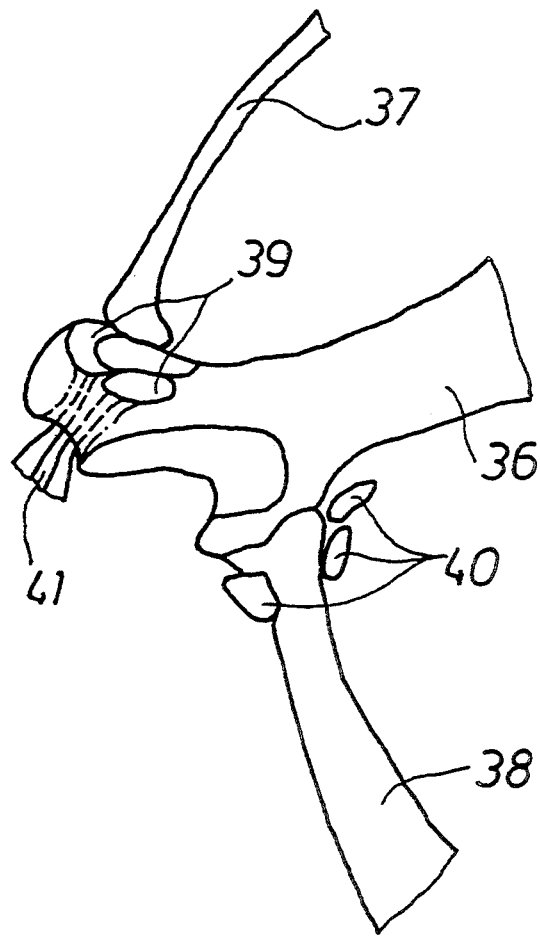
FIG. 3 shows a sectional representation of the skeletal structure and tendon arrangement in the region of the wing joint.

The separating apparatus according to FIG. 2 is installed in a non-represented frame of a poultry processing machine. The apparatus may form an integral component of a machine having further processing stations or it may be realized as an independent unit. A conveyor means 1, which is only suggested in the drawings (indicated by a dashed line), runs through the machine and may, for example, consist of an endless chain conveyor driven in an appropriate manner and equipped with supporting saddles 3 for supporting and conveying poultry bodies 30 during processing.

The separating apparatus consists of a plurality of separating tools 4, 5 and 6 arranged one after the other, each comprising pairs of knife blades 7, 8 and 9, arranged symmetrically on either side of the path of the conveyor means 1. Guide means for guiding, seizing and spreading or lifting the poultry body wings 34 away from the bodies are provided in the region of the separating tools. Of these guide means, only a pair of guide rails 10 are shown, arranged symmetrically on either side of the path of the conveyor means 1, which have the task of guiding the poultry body 30 by means of the dip between the wings 34 and the breast portion 32. The guide means for gripping and spreading or lifting away the wings 34 can consist, in a known manner, of a pair of conveying chains running alongside the conveyor means 1 and diverging therefrom, which are driven together with the conveyor means 1 and are provided with means for positively seizing the wing 34.

Each knife blade 7 of a first 4 of four separating tools is mounted to pivot about an axis 11 and has the form of a double-armed lever which extends along the length of the associated guide rail 10. Each knife blade 7 is disposed in an external flattened portion 12 of the guide rail 10 and arranged such that both knife blades are pivotable in planes which together enclose an angle opening upwards of about 90°. On the lower edge of the leading portion of each knife blade, in the direction of conveyor movement, there is provided a cutting edge 13, which projects beyond the lower edge of the associated guide rail 10 in the rest position. A detection or feeler lever 14, tortionally fixed to the knife blade 7, engages the portion of knife blade 7 which is directed against the direction of movement of the conveyor, protrudes in a towing or leading position into the path of the poultry bodies 30 and is arranged such that its feeler or detecting portion 15 projects beyond the knife blade cutting edge 13 upstream of the end part of the knife blade 7 in the conveying direction.

A second one 5 of said separating tools is arranged below the guide rails 10 and downstream of the first separating tool 4. Both knife blades 8 of the second separating tool 5 are formed mirror inverted with respect to one another and comprise cutting edges 16 directed upwards which, in the direction of conveyance of the poultry body 30, are ascendingly inclined and converge towards one another. Moreover, the flanks 8 of the two knife blades which face one another are convexly formed. Each knife blade 8 is attached to a carrying arm 17, and is pivotable about an axis 18 lying perpendicular to said carrying arm and is spring loaded to be resiliently outwardly yielding (i.e. out of the path of the poultry bodies). A detecting or sensing lever 19 is engaged with each carrying arm 17 and extends into the path of the supporting saddle 3.

A third one 6 of said separating tools is arranged directly downstream of the second separating tool 5 and comprises a pair of knife blades 9 as described above. Each knife blade 9 is essentially triangular in shape with one side formed as a cutting edge 20. The knife blades 9 are oriented such that their cutting edges 20 rise in relation to the path of the conveyor means 1 so that they cross the path of the poultry bodies 30 and such that in the rest or reset position, they converge towards one another. Each knife blade 9 is mounted to pivot about an essentially horizontal axis 21 which runs along the base edge of the triangular blade, and in the rest or reset position, the blade faces of the two knife blades 9 are arranged slightly inclined relative to one another forming a roof-like shape. Each axis 21 is mounted in a carrying element 22, which is controlled by means of parallelogram connecting rods 23 and 24 to move in a horizontal plane so that the distance between the knife blades 9 is adjustable on parallel controlled movement. Each axis 21 is provided with a crank 25, whose free end is engaged with a connecting rod 26, which in turn is mounted on the frame at its other end, whereby the crank has the effect that on increasing the spacing distance between the knife blades 9, the latter are oriented or tilted outwards. The spacing control is achieved with a transmission system, not shown, which is driven synchronously with the conveyor means 1, and by means of which there results a pivoting of the parallelogram connecting rod 23 in the opposite direction in a predetermined manner.

The operation of the apparatus will be described in the following with reference to the passage of a poultry body 30, which has been prepared with a diagonal cut between the upper and lower extremities and transversely through the backbone. The poultry body 30 to be processed is thus a body portion, comprising the breast cavity with neck portion 31, breast portion 32, a part of the back portion 33 and the wings 34. In the processing described below, the anatomical characteristics of the wing joint 35 are important and this region is represented in FIG. 3 and includes the front ends of the coracoids 36 at which the wishbone 37 and the shoulder blades 38 are attached. In the region of attachment of the wishbone 37 the points of attachment of two tendons 39 are to be found which are connected to the breast portion 32. In the region of attachment of the shoulder blades 38 are three tendons 40 which are connected to the back portion 33 and ensure that the wing joint 35 is held together. Finally, there are also the tendon chords 41 which move the wings 34, and which pass through a hole in the coracoids 36 at the joint.

A poultry body 30 of this type, also termed a "front half", is placed onto one of the supporting saddles 3 of the conveyor means 1 with the breast portion 32 uppermost and the neck portion 31 leading. In this way, the poultry body is inevitably oriented such that the breast portion 32 extends essentially horizontally and the joints connecting the wings to the body 30, hereafter called wing joints 35, assume a particular position in relation to the supporting saddle 3. In this position, the poultry body 30 is guided under the guide rails 10, which enter the dip between the wings 34 and the breast portion 32 and guide the latter between them. Simultaneously, the wings 34 are gripped by the non-presented guide means and are spread or lifted away from the body with progressive motion.

The poultry body 30 thus first arrives in the region of the knife blades 7 of the first separating tool 4. Thereby, the skin in the dip and the flesh parts beneath this are severed as far as the coracoids 36 and the tendons 39 are at least nicked. Once the wing joints 35 have passed by the knife blades 7, the detection levers 14 descend onto the poultry body 30 and ensure that the knife blades 7 come out of contact with the body 30. In this way, possible damage by the knife blades 7 to the succeeding body parts is avoided.

The further progression of the conveyor brings the poultry body 30 into the region of the second separating tool 5, in the course of which motion the wings are extended still further by the non-represented guide means. By means of their cutting edges 16, this separating tool's 5 knife blades 8 ensure that the skin and flesh parts between wings 34 and the back portion 33 and also the tendons 40 are cut. In doing this, the contact of detecting lever 19 with the supporting saddle 3 controls the movement of the knife blades 8 such that the effect of the knife blades 8 in the region of the wing joints 35 remains limited.

The wings 34 have been markedly loosened by this point so that the continued spreading of the wings 34 causes them to be lifted out of the wing joints 35. Thus, the cutting edges 20 of the third separating tool's 6 knife blades 9 can penetrate into the space between the condoyle and glenoid cavity of each wing joint 35 and detach the remaining skin, flesh parts and tendon chords 41. In doing this, the movement of the knife blades 9 is controlled in such a way that both the anatomical characteristics and the requirement for an extremely economical cut are taken into account.

By means of the described "three-cut" separating method, the detachment of the wings 34 from a poultry body 30 is performed in such a way that the yield of breast fillet meat is greatly improved compared with conventional procedures, while the occurrence of bone splinters in the attachment region of the wings 34 is reliably avoided.

We claim:

1. A method for processing poultry in the form of at least a portion of a poultry body including wings, by separating said wings from said poultry body, said poultry body defining a plane of symmetry, a breast side and a back side and essentially comprising at least said wings, a neck portion, a back portion, a breast portion, a dip between said wings and said breast portion and tissue parts, as well as wing joints including coracolds, a wishbone and shoulder blades attached to said coracoids, tendons being joined in the region of attachment of said coracoids to said wishbone and in the region of attachment of said coracoids to said shoulder blades, and tendon connections between said wing joints and said wings, said method being performed by effecting cuts in said poultry body on both sides of said plane of symmetry while extending said wings away from said poultry body, whereby said cuts include:
    a) a pair of first incisions from said breast side for severing said tissue parts in said dip up to said coracoids;
    b) a pair of second incisions from said back side for severing the tissue parts between said wings and said back portion as well as the tendons in the region of attachment of said shoulder blades to said coracoids; and
    c) a pair of third cuts for severing the remaining of said tissue parts and tendon connections.

2. An apparatus for processing poultry in the form of at least a portion of a poultry body including wings, by separating said wings from said poultry body, said poultry body defining a plane of symmetry, a breast side and a back side and essentially comprising at least said wings, a neck portion, a back portion, a breast portion, a dip between said wings and said breast portion and tissue parts, as well as wing joints including coracoids, a wishbone and shoulder blades attached to said coracoids, tendons being joined in the region of attachment of said coracoids to said wishbone and in the region of attachment of said coracoids to said shoulder blades and tendon connections between said wing joints and said wings, said method being performed by effecting cuts in said poultry body on both sides of said plane of symmetry while extending said wings away from said poultry body, said apparatus comprising conveyor means for conveying said poultry body along its plane of symmetry with said neck portion leading, such that said poultry body describes a conveying path; wing detaching means arranged along said conveying path through which said poultry bodies pass, formed by pairs of separating tool means arranged symmetrically and mirror inverted on either side of said conveyor means, each said pair of separating tool means comprising knife blades having flanks and cutting edges which extend essentially along said conveying path, and guide means, arranged in the vicinity of said separating tool means for seizing said wings and lifting the same away from said poultry body, said separating tool means being arranged such that there is provided sequentially along said conveying path:
    a) a pair of first knife blades for performing a pair of first incisions from said the breast side of said poultry body for severing said tissue parts in said dip up to said coracoids, said first knife blades being spring loaded such that in a rest position said cutting edges are arranged to cross the path of said wing joints from said breast side,
    b) a pair of second knife blades for performing a pair of second incisions from said back side of the poultry body for severing the tissue parts between said wings and said back portion as well as said tendons in the region of attachment of said shoulder blades to said coracoids, the cutting edges of said second blades being arranged in a position tangential to the path of said wing joints on said back side and being resiliently outwardly yielding against spring force with respect to the spacing between them, and
    c) a pair of third knife blades for performing a pair of third cuts for severing the remaining tissue parts and tendon connections, the cutting edges of said third knife blades being arranged to rise in the direction of conveyance and oriented to cross the path of said wing joints, the attachment of said knife blades being such that they are at least one of resiliently yieldable against spring force and controllable with regard to the distance between said third knife blades and the angle formed between their flanks.

3. An apparatus as claimed in claim 2, wherein said first knife blades are each pivotable in planes extending along said conveying path, said planes enclosing between them an angle of about 90° opening towards said poultry body breast side.

4. An apparatus as claimed in claim 3, wherein there are provided control means, associated with said first knife blades for controllably moving the same out of said conveying path.

5. An apparatus as claimed in claim 3, wherein said control means comprise at least a detection lever which is arranged to trail behind said knife blade in the direction of conveyance and protrude into said conveying path.

6. An apparatus as claimed in claim 4, wherein said control means comprise at least a detection lever which is arranged to trail behind said knife blade in the direction of conveyance and protrude into said conveying path.

7. An apparatus as claimed claim 2, wherein said cutting edges of said second knife blades are arranged such that they rise and converge towards one another in the direction of conveyance, the opposing flanks of said second knife blades being essentially convex in shape with respect to one another.

8. An apparatus as claimed in claim 3, wherein said cutting edges of said second knife blades are arranged such that they rise and converge towards one another in the direction of conveyance, the opposing flanks of said second knife blades being essentially convex in shape with respect to one another.

9. An apparatus as claimed in claim 4, wherein said cutting edges of said second knife blades are arranged such that they rise and converge towards one another in the direction of conveyance, the opposing flanks of said second knife blades being essentially convex in shape with respect to one another.

10. An apparatus as claimed in claim 5, wherein said cutting edges of said second knife blades are arranged such that they rise and converge towards one another in the direction of conveyance, the opposing flanks of said second knife blades being essentially convex in shape with respect to one another.

11. An apparatus as claimed in claim 6, wherein said cutting edges of said second knife blades are arranged such that they rise and converge towards one another in the direction of conveyance, the opposing flanks of said second knife blades being essentially convex in shape with respect to one another.

12. An apparatus as claimed in claim 2, wherein said third knife blade pair is arranged such that the spacing between said blades is adjustable by parallel guidance.

13. An apparatus as claimed in claim 3, wherein said third knife blade pair is arranged such that the spacing between said blades is adjustable by parallel guidance.

14. An apparatus as claimed in claim 4, wherein said third knife blade pair is arranged such that the spacing between said blades is adjustable by parallel guidance.

15. An apparatus as claimed in claim 6, wherein said third knife blade pair is arranged such that the spacing between said blades is adjustable by parallel guidance.

16. An apparatus as claimed in claim 9, wherein said third knife blade pair is arranged such that the spacing between said blades is adjustable by parallel guidance.

17. An apparatus as claimed in claim 2, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

18. An apparatus as claimed in claim 3, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

19. An apparatus as claimed in claim 6, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

20. An apparatus as claimed in claim 9, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

21. An apparatus as claimed in claim 12, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

22. An apparatus as claimed in claim 5, wherein said third knife blade pair is arranged such that the spacing between said blades is adjustable by parallel guidance.

23. An apparatus as claimed in claim 7, wherein said third knife blade pair is arranged such that the spacing between said blades is adjustable by parallel guidance.

24. An apparatus as claimed in claim 8, wherein said third knife blade pair is arranged such that the spacing between said blades is adjustable by parallel guidance.

25. An apparatus as claimed in claim 10, wherein said third knife blade pair is arranged such that the spacing between said blades is adjustable by parallel guidance.

26. An apparatus as claimed in claim 11, wherein said third knife blade pair is arranged such that the spacing between said blades is adjustable by parallel guidance.

27. An apparatus as claimed in claim 4, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

28. An apparatus as claimed in claim 5, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

29. An apparatus as claimed in claim 7, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

30. An apparatus as claimed in claim 8, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

31. An apparatus as claimed in claim 10, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

32. An apparatus as claimed in claim 11, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

33. An apparatus as claimed in claim 13, wherein each said third knife blade is mounted to pivot about an axis extending along said conveying path, rod means being provided, which on increasing the distance between said third knife blades, effect a pivoting of the same about these axes so as to increase the angle enclosed between the flanks of said third knife blades.

* * * * *